United States Patent
Lee et al.

(10) Patent No.: US 8,799,585 B2
(45) Date of Patent: *Aug. 5, 2014

(54) CACHE MEMORY CAPABLE OF ADJUSTING BURST LENGTH OF WRITE-BACK DATA IN WRITE-BACK OPERATION

(71) Applicant: Samsung Electronics Co., Ltd., Suwon-si (KR)

(72) Inventors: Kil Whan Lee, Seoul (KR); Young Jin Chung, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/893,746

(22) Filed: May 14, 2013

(65) Prior Publication Data

US 2013/0254493 A1  Sep. 26, 2013

Related U.S. Application Data

(63) Continuation of application No. 12/313,981, filed on Nov. 26, 2008, now Pat. No. 8,443,152.

(30) Foreign Application Priority Data

Nov. 27, 2007 (KR) .................. 10-2007-0121450

(51) Int. Cl.
*G06F 13/00* (2006.01)

(52) U.S. Cl.
USPC .................. 711/143; 711/E12.053

(58) Field of Classification Search
None
See application file for complete search history.

(56) References Cited

U.S. PATENT DOCUMENTS

| | | |
|---|---|---|
| 5,631,909 A | 5/1997 | Weng et al. |
| 6,185,637 B1 | 2/2001 | Strongin et al. |
| 6,615,308 B1 | 9/2003 | Fanning |
| 6,766,431 B1 * | 7/2004 | Moyer .......................... 711/168 |
| 7,076,614 B2 | 7/2006 | Sperber et al. |
| 2004/0260908 A1 | 12/2004 | Malik et al. |
| 2006/0090056 A1 | 4/2006 | Johnson |
| 2006/0265568 A1 | 11/2006 | Burton |

FOREIGN PATENT DOCUMENTS

EP  1607869 A1  12/2005

* cited by examiner

*Primary Examiner* — Sean D Rossiter
(74) *Attorney, Agent, or Firm* — Onello & Mello, LLP (57) ABSTRACT

A cache memory includes a write-back determination unit and a burst length determination unit. The write-back determination unit determines whether a block is a write-back block based on an n-bit dirty value of the block. The burst length determination unit determines a burst length of write-back data included in the write-back block based on the n-bit dirty value and an minimum burst length, when the block is the write-back block.

14 Claims, 5 Drawing Sheets

CACHE MEMORY CAPABLE OF ADJUSTING BURST LENGTH OF WRITE-BACK DATA IN WRITE-BACK OPERATION

RELATED APPLICATION

This application is a continuation of U.S. application Ser. No. 12/313,981, filed on Nov. 26, 2008, which claims priority under 35 U.S.C. 119 to Korean Patent Application No. 10-2007-0121450, filed in the Korean Intellectual Property Office on Nov. 27, 2007, the contents of which are incorporated herein by reference in their entirety.

BACKGROUND

1. Technical Field

Example embodiments relate to a semiconductor device, and more particularly, to a cache memory capable of adjusting the burst length of write-back data in a write-back operation, and a system including the cache memory.

2. Description of Related Art

To embody a high performance product capable of efficiently using a main memory and performing faster memory access, use of a cache memory or a write buffer has gradually increased not only in a central processing unit (CPU) but also in various co-processors, for example, 3D graphics processors. The cache memory is a high-speed memory device which stores a portion of the data stored in main memory that is frequently accessed by the CPU. The cache memory may read and write data at high speed, that is, tens to hundreds of times faster than a hard disk drive (HDD) reads and writes data.

That is, the cache memory stores data having a high frequency of use in a high-speed memory device, of the data stored in the main memory, and instantly outputs corresponding data according to a request by the CPU. Accordingly, desired data may be accessed at higher speed, compared to a case in which all data is stored in a low-speed memory device, for example, the HDD. Thus, when the data already read by the CPU is repeatedly accessed, the cache memory may access the data very quickly, in contrast with the case of a first access of the data from the main memory. As a result, the efficiency of a system using the cache memory is improved.

The cache memory includes a write-through cache and a write-back cache. The write-through cache, during a write operation, updates data stored in a block of the write-through cache with written data (hereinafter, referred to as the "write data") and simultaneously updates data stored in the main memory with the write data. The write-back cache updates only data stored in a block of the write-back cache with the write data, during the write operation. When a cache miss is generated during a subsequent read operation, the write-back cache updates the data stored in the main memory with the write data, only when a block that needs to be emptied to store data corresponding to a data request signal output by the CPU in the block of the write-back cache includes the write data. The write-back cache is widely used to reduce the frequency of data accesses to the main memory.

In general, since the number of blocks to be stored in a cache memory is limited, when all blocks in the cache memory include the write data, that is, in a case of dirty or update, at least one block needs to be emptied for the next data access. Also, since the cache memory accesses data of the main memory in units of blocks and a processor accesses data of the cache memory in units of words, only a portion of the data in the block is usually changed.

A conventional computer system, for example, a microprocessor, does not need a cache memory having a large sized block. Thus, since the block size of the cache memory is small, any waste of bandwidth is not significant even when data that is not updated is transmitted to the main memory via a system bus. The bandwidth signifies a data transmission quantity, that is, the amount of data that can be transmitted by the cache memory to the main memory at one time.

However, as more diverse applications for cache memory are developed and the required amount of data transmission in systems increases, a cache memory having a block of a larger size, for example, 64 bytes or more, is required in a computer system, in particular, multimedia hardware. For processing such a large amount of data, the bandwidth of a system bus is increased to 64 bits or 128 bits.

Accordingly, in a conventional cache memory, since not only the write data in a block but also data that is not written is all transmitted to the main memory via the system bus, a large amount of the bandwidth is wasted. Thus, there is a demand for a cache memory that may decrease the bandwidth by adjusting the burst length of write-back data during the write-back operation.

SUMMARY

To solve the above and/or other problems, the present invention provides a cache memory capable of variably adjusting a burst length to transmit write-back data to a main memory so that the write-back data may include write data in a write-back operation, and a system including the cache memory.

According to an aspect of the present invention, a cache memory comprises a write-back determination unit and a burst length determination unit. The write-back determination unit determines whether a block is a write-back block based on an n-bit dirty value of the block. The burst length determination unit determines a burst length of write-back data included in the write-back block based on the n-bit dirty value and a minimum burst length, when the block is the write-back block.

The burst length may be an integer multiple of the minimum burst length. The cache memory may further comprise a dirty value storing unit storing the n-bit dirty value.

The cache memory may further comprise a data storing unit storing data of the write-back block and a processor controlling the data storing unit to output the write-back data to a system bus of data of the write-back block stored in the data storing unit, in response to a determined burst length.

The cache memory may further comprise a write-back buffer storing the write-back data output to the system bus.

According to another aspect of the present invention, a cache memory comprises a write-back determination unit and a burst length determination unit. The write-back determination unit determines whether a block is a write-back block based on replacement information on the block and an n-bit dirty value of the block. The burst length determination unit determines a burst length of write-back data included in the write-back block based on the n-bit dirty value and the minimum burst length, when the block is the write-back block.

The replacement information may comprise information on the block, frequency of accesses of the block, and/or data update time of the block.

According to another aspect of the present invention, a system comprises a main memory receiving and storing write-back data output from a cache memory via a system bus. The cache memory comprises a data storing unit storing data of a block, a write-back determination unit determining whether the block is a write-back block based on an n-bit dirty value of the block, a burst length selection unit determining a burst length of the write-back data of the data of the block based on the n-bit dirty value and an minimum burst length, when the block is the write-back block, and a processor controlling the data storing unit to output the write-back data of the data of the block stored in the data storing unit to the system bus, in response to a determined burst length.

In one embodiment, when the write-back determination unit further receives replacement information on the block, the write-back determination unit determines whether the block is the write-back block based on the n-bit dirty value and the replacement information.

The burst length may be an integer multiple of the minimum burst length.

The burst length may be an integer multiple of a value obtained by dividing the size of the block by the number of bits forming the dirty value.

BRIEF DESCRIPTION OF THE DRAWINGS

The foregoing and other features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
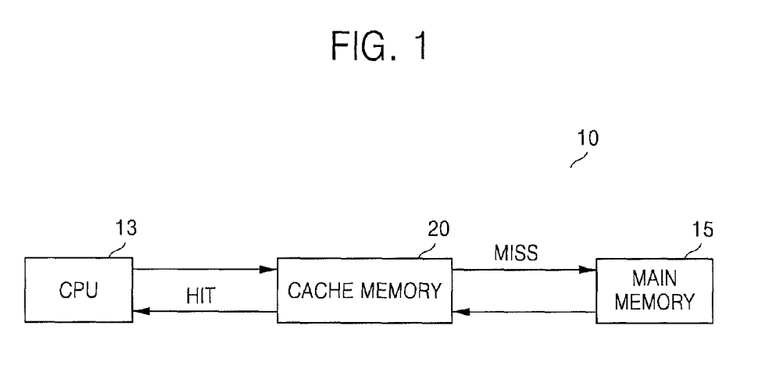
FIG. 1 is a block diagram of a computer system according to an embodiment of the present invention.

FIG. 1 is a block diagram of a computer system 10 according to an embodiment of the present invention. Referring to FIG. 1, the computer system 10 includes a central processing unit (CPU) 13, a cache memory 20, and a main memory 15. The computer system 10 may be a personal computer (PC), a mobile communication device, a personal digital assistant (PDA), or a smart card.

The CPU 13 performs an application to execute a write command or a read command based on an input command, for example, the write command or the read command, and controls a write operation or a read operation of the computer system 10.

The main memory 15 is a large-capacity memory device or an external memory device having an operation speed to access data slower than that of a main memory device (not shown) or an internal memory device in the CPU 13, but capable of compensating for the lack of a capacity of the main memory device.

The main memory 15 may be a hard disk drive (HDD), a floppy disk drive (FDD), a compact disk read only memory (CD-ROM) drive, or a nonvolatile memory device such as a flash EEPROM.

The cache memory 20 is connected between the CPU 13 and the main memory 15, which have different operation speeds. The cache memory 20 compares read addresses with tags stored in a tag storing unit 27 of FIG. 2 in response to a read command including a read address output from the CPU 13 and determines HIT or MISS according to a result of the comparison.

Figure 2:
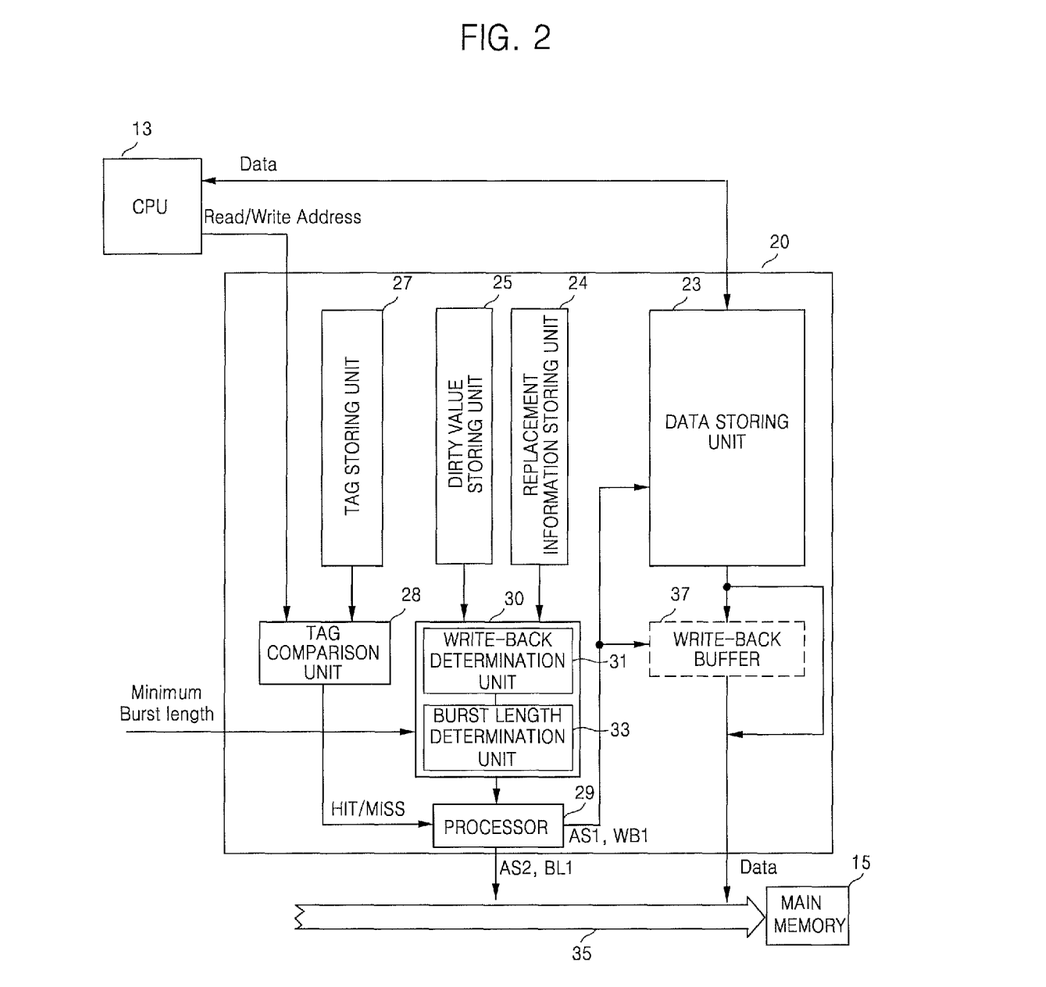
FIG. 2 is a block diagram of a cache memory capable of determining the burst length of write-back data according to an embodiment of the present invention.

For the case of a HIT according to a result of the determination, the cache memory 20 reads out data corresponding to the read address from a data storing unit 23 of FIG. 2 and outputs read data DATA to the CPU 13. For the case of a MISS, the cache memory 20 reads out the data corresponding to the read address from the main memory 15 of FIG. 2 via a system bus 35 of FIG. 2, outputs read data DATA to the CPU 13, and stores the read data DATA in the data storing unit 23.

The cache memory 20 writes write data in an area designated by a write address, for example, the data storing unit 23 and/or the main memory 15, in response to a write command including the write address output from the CPU 13. The cache memory 20 exchanges data with the main memory 15 in units of blocks or sub-blocks. A block includes a plurality of words having tags and data. The size of the block, for example, 8 bytes, 16 bytes, 32 bytes, 64 bytes, or 128 bytes, may vary according to the structure of the computer system 10, for example, the structure of the system bus 35 or the data storing unit 23. In the present embodiment, although the cache memory 20 indicates a cache memory existing between the CPU 13 and the main memory 15, the cache memory 20 may also include (or indicate) a buffer cache or a write buffer.

FIG. 2 is a block diagram of the cache memory 20 capable of determining the burst length of a write-back data according to an embodiment of the present invention. Referring to FIG. 2, the cache memory 20 includes a data storing unit 23, a replacement information storing unit 24, a dirty value storing unit 25, a tag storing unit 27, a tag comparison unit 28, a write-back control unit 30, and a processor 29. In FIG. 2, for the convenience of description, the cache memory 20, the CPU 13, and the main memory 15 are illustrated together.

The processor 29 generates output signal AS1, AS2, BL1, or WB1 for performing the read operation or write operation based on an input signal, for example, HIT or MISS.

The data storing unit 23 stores data corresponding to each of a plurality of blocks previously accessed. The tag storing unit 27 stores a tag corresponding to each of the blocks so that the tag comparison unit 28 may determine HIT or MISS, in response to the read address or write address output from the CPU 13.

Each of the data storing unit 23 and/or the tag storing unit 27 may be embodied by an SRAM or register. The tag comparison unit 28 compares the received read address and each of the tags stored in the tag storing unit 27 in response to the read address output from the CPU 13, and determines HIT or MISS as a result of the comparison.

If the result of the comparison is HIT, the data storing unit 23 instantly outputs data corresponding to the read address to the CPU 13 in response to a read operation signal AS1 output from the processor 29. If the result of the comparison is MISS, the processor 29 transmits a data request signal AS2 including the read address to the main memory 15, reads out (or receives) the data corresponding to the read address, and transmits the read data to the data storing unit 23 and simultaneously outputs the read data to the CPU 13.

The dirty value storing unit 25 stores a dirty value of each of the blocks stored in the data storing unit 23. Each dirty value is formed of n bits, where n is a natural number of 2 or higher. Each of the n bits indicates whether to write data included in each of a plurality of sub-blocks which form each of the blocks. When at least part of the data included in the sub-block is the write data, the bit indicating the sub-block is "1" which is referred to as an effective (or valid) bit.

The replacement information storing unit 24 stores replacement information corresponding to each of the blocks so that a write-back determination unit 31 may select at least any one of the blocks according to a replacement procedure. Each item of replacement information may be information on a block corresponding to the n-bit dirty value, the number of accesses to the block, or the data write (or update) time of the block.

The write-back control unit 30 includes the write-back determination unit 31 and a burst length determination (selection) unit 33. The write-back determination unit 31 receives the n-bit dirty value output from the dirty value storing unit 25 and/or the replacement information output from the replacement information storing unit 24, selects at least any one block or sub-block of the blocks according to the replacement procedure based on the n-bit dirty value and/or the replacement information, and determines whether to perform the write-back operation.

The replacement procedure may be a least recently used (LRU) procedure, a least frequency used (LFU) procedure, or a first in first out (FIFO) procedure. Thus, the write-back determination unit 31 determines which one of the blocks is to be written-back (hereinafter, referred to as the "write-back block") based on the n-bit dirty value output from the dirty value storing unit 25 and/or the replacement information output from the replacement information storing unit 24.

The burst length determination unit 33 determines the burst length m of data to be written-back (hereinafter, referred to as the "write-back data") among data of a write-back block determined based on an n-bit dirty value corresponding to a write-back block determined or selected by the write-back determination unit 31 and an minimum burst length.

The burst length determination unit 33 determines the burst length m that is proportional to an integer multiple of the minimum burst length, according to the number of the n-bit forming a dirty value corresponding to the write-back block. For example, when the minimum burst length is 4, m may be a multiple of 4. That is, the burst length determination unit 33 may determine the burst length m according to the number of effective bits of the n-bit forming a dirty value corresponding to the write-back block.

Also, even when the n-bits corresponding to the write-back block are not all effective bits, the burst length determination unit 33 may select the maximum burst length, for example, 16. For example, when latency for reading and writing data by the cache memory 20 is long, the performance of the cache memory 20 is better as data is output in the maximum burst length. The burst length determination unit 33 may vary the burst length of the write-back data by recognizing at least one bit, for example, data "0", existing between the effective bits, for example, data "1", of the n-bits forming a dirty value, as the effective bit.

Also, since the computer system 10 may write back a write-back data to the main memory 15 via the system bus 35 in a burst length of 4, 8, or 16, the burst length determination unit 33 may change the burst length of the write-back data by recognizing at least one bit existing between the effective bits according to the n-bits forming a dirty value, as the effective bit. That is, in this case, since the latency of the cache memory 20 for transmitting to the main memory 15 not only the data of a sub-block corresponding to the effective bit, for example, "1", but also the data of a sub-block corresponding to the non-effective bit that is not the effective bit, for example, "0", is shorter than that of the cache memory 20 for transmitting only the data of a sub-block corresponding to the effective bit to the main memory 15, the cache memory 20 may access data at high speed.

The processor 29 generates a write-back operation signal WB1 based on the replacement information of the write-back block and/or the determined burst length output by the write-back control unit 30 and outputs a generated write-back operation signal WB1 to the data storing unit 23. The data storing unit 23 outputs write-back data of the data of a block corresponding to the write-back operation signal WB1. The write-back data is written back to the main memory 15 in units of sub-blocks. The data storing unit 23 of the cache memory 20, under the control of the processor 29 and in response to the write-back operation signal WB1, may write back the write-back data having a determined burst length to the main memory 15 via the system bus 35.

As described above, the cache memory 20 according to the present embodiment may adjust the burst length m of the write-back data to include all the write data. A method of selecting the burst length m of the write-back data by the burst length determination unit 33 based on the dirty value of the write-back block is described in detail with reference to FIGS. 3 and 4.

The cache memory 20 may further include a write-back buffer 37 for temporarily storing the write-back data output from the data storing unit 23 to the main memory 15 to perform the write-back operation. The minimum burst length and the maximum burst length of the cache memory 20 may be diversely determined according to the computer system 10 based on the bandwidth of the system bus 35, the structure, for example, the size, of a block, of the data storing unit 23, or the setting of a special function resistor (SFR). The cache memory 20 may further include a controller (not shown) for setting the SFR to store a value for adjusting or determining the burst length of the write-back data. The controller may be embodied inside or outside the cache memory 20. When the controller is embodied outside the cache memory 20, the controller may be embodied as a part of the CPU 13.

Figure 3:
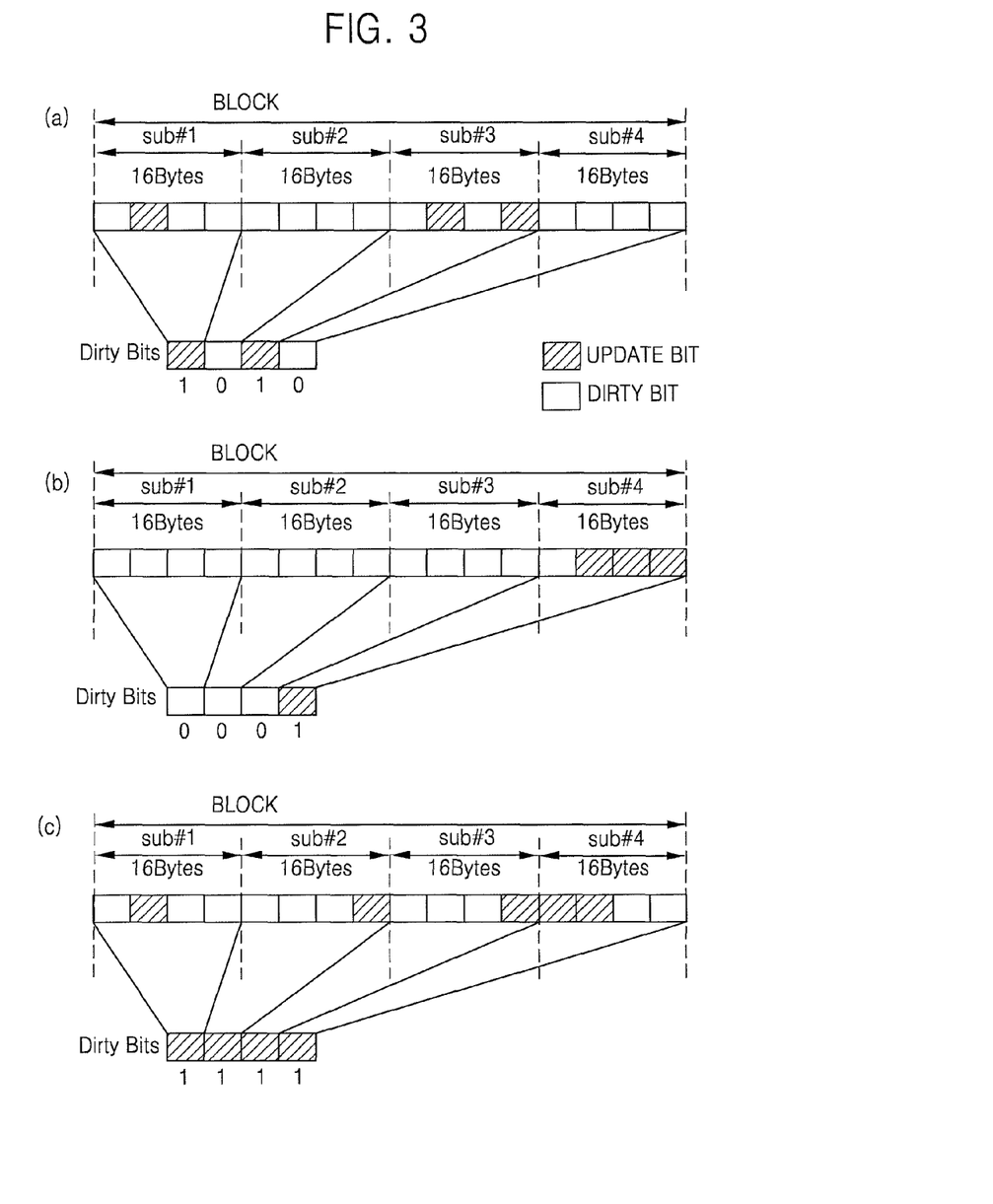
FIG. 3 includes three diagrams illustrating dirty values stored in the dirty value storing unit according to an embodiment of the present invention.

The diagrams (a) through (c) of FIG. 3 indicate a dirty value stored in the dirty value storing unit 25 according to an embodiment of the present invention. Referring to FIG. 3 an example of a 4-bit dirty value is shown in the computer system 10 in which the size B of a block is 64 bits and the bandwidth of the system bus 35 is 32 bits. In FIG. 3, when part of the data stored in each of the sub-blocks is changed to the write data, a bit corresponding to a sub-block including the write data is set to be a first level, for example, a high level or data "1".

Figure 4:
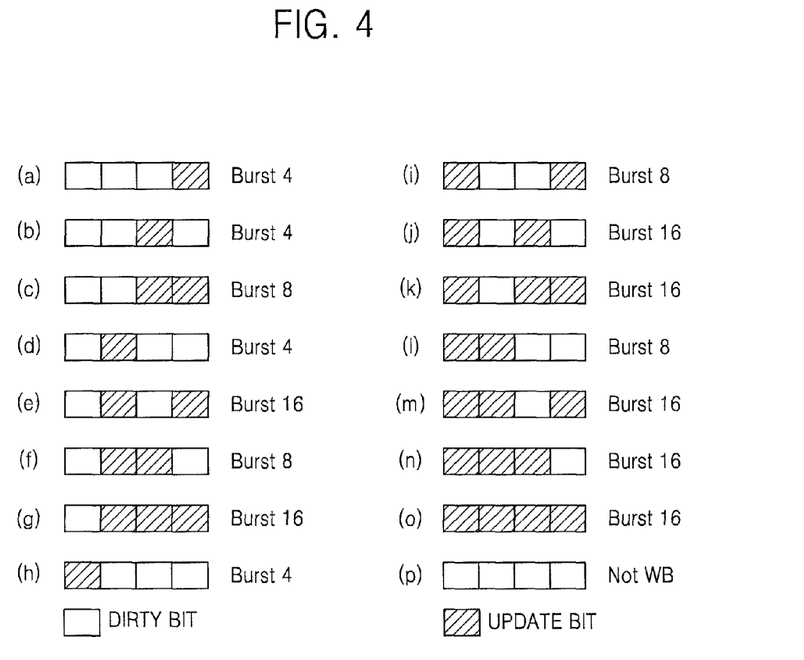
FIG. 4 includes sixteen (16) diagrams illustrating the burst lengths of write-back data determined according to a 4-bit dirty value.

The bit having the first level is referred to as an effective bit. The effective bit is indicated as a hatched area as shown in FIGS. 3 and 4. Also, the non-effective bit having a second level, for example, a low level or data "0", indicates that the data of a sub-block does not include the write data. The non-effective bit is indicated as an area that is not hatched as shown in FIGS. 3 and 4.

As shown in FIG. 3, each block of the cache memory 20 is 64 bytes and the dirty value is 4 bits. Thus, one block (BLOCK) includes four sub-blocks sub#1, sub#2, sub#3, and sub#4. Each of the sub-blocks sub#1, sub#2, sub#3, and sub#4 is 4 bytes. Thus, when the BLOCK is B bytes and the dirty value is n bits, the size of a sub-block is $B/n=64/4=16$ bytes.

In diagram (a) of FIG. 3, a dirty value "1010" indicates that at least part, for example, 1 byte, of the data, for example, 16 bytes, stored in each of the sub-blocks sub#1 and sub#3 of a block is changed to the write data. In diagram (b) of FIG. 3, a dirty value "0001" indicates that at least part of the data stored in the sub-block sub#4 of a block is changed to the write data. In diagram (c) of FIG. 3, a dirty value "1111" indicates that at least part of the data stored in each of all sub-blocks sub#1, sub#2, sub#3, and sub#4 of a block is changed to the write data. For example, the write data may be written or updated by the bandwidth of the system bus 35, that is, 4 bytes.

Diagrams (a) through (p) of FIG. 4 illustrate the burst lengths of the write-back data determined according to the 4-bit dirty values. That is, diagrams (a) through (p) of FIG. 4 illustrate the burst lengths of the write-back data determined according to the 4-bit dirty values corresponding to the respective blocks, stored in the dirty value storing unit 25 of the cache memory 20.

The write-back control unit 30 of the cache memory 20, in response to the n-bit dirty value with respect to each of the blocks, determines a write-back block of the blocks and then a burst length m of the write-back data proportional to an integer multiple of the minimum burst length, or the sub-block, based on the n-bit dirty value of the determined write-back block, in particular, the number of the effective bits.

For example, when the 4-bit dirty value has an effective bit, for example, "1", that is, in the case of the dirty value "0001" of diagram (a) of FIG. 4, that is, when at least part of the data stored in the sub-block sub#4 is changed to the write data, the dirty value "0010" of diagram (b) of FIG. 4, that is, when at least part of the data stored in the sub-block sub#3 is changed to the write data, the dirty value "0100" of diagram (d) of FIG. 4, that is, when at least part of the data stored in the sub-block sub#2 is changed to the write data, or the dirty value "1000" of diagram (h) of FIG. 4, that is, when at least part of the data stored in the sub-block sub#1 is changed to the write data, the cache memory 20 writes back the data stored in each sub-block sub#4, sub#3, sub#2, or sub#1 corresponding to each effective bit, that is, the write-back data, in the burst length of 4, to the main memory 15 via the system bus 35. For example, when the minimum burst length is 4, the cache memory 20 transmits the write-back data in the minimum burst length to the main memory 15 via the system bus 35.

Also, when the 4-bit dirty value has two effective bits, for example, for a dirty value "0011" of diagram (c) of FIG. 4, that is, when at least part of the data stored in each of the sub-blocks sub#3 and sub#4 is changed to the write data, the cache memory 20 writes back the write-back data stored in each of the sub-blocks sub#3 and sub#4 in the burst length of 8 to the main memory 15 via the system bus 35.

For a dirty value "0110" of diagram (f) of FIG. 4, that is, when at least part of the data stored in each of the sub-blocks sub#2 and sub#3 is changed to the write data, the cache memory 20 writes back the write-back data stored in each of the sub-blocks sub#2 and sub#3 in the burst length of 8 to the main memory 15 via the system bus 35. For a dirty value "1001" of diagram (i) of FIG. 4, that is, when at least part of the data stored in each of the sub-blocks sub#1 and sub#4 is changed to the write data, the cache memory 20 writes back the write-back data stored in each of the sub-blocks sub#1 and sub#4 in the burst length of 8 to the main memory 15 via the system bus 35. For a dirty value "1100" of diagram (1) of FIG. 4, that is, when at least part of the data stored in each of the sub-blocks sub#1 and sub#2 is changed to the write data, the cache memory 20 writes back the write-back data stored in each of the sub-blocks sub#1 and sub#2 in the burst length of 8 to the main memory 15 via the system bus 35. That is, the cache memory 20 transmits the write-back data in the burst length of the minimum burst length×2 to the main memory 15 via the system bus 35.

When the dirty value is "0101" as in diagram (e) of FIG. 4, "0111" as in diagram (g) of FIG. 4, "1010" as in diagram (j) of FIG. 4, "1011" as in diagram (k) of FIG. 4, "1101" as in diagram (m) of FIG. 4, "1110" as in diagram (n) of FIG. 4, or "1111" as in diagram (o) of FIG. 4, the cache memory 20 writes back the write-back data of the write-back block in the burst length of 16 to the main memory 15 via the system bus 35.

Also, when the dirty value is "0000" as in diagram (p) of FIG. 4, that is, when the 4-bit dirty value includes no effective bit, the cache memory 20 does not write back the data of the block corresponding to the 4-bit dirty value "0000" to the main memory 15.

As described above with reference to diagrams (e), (g), (j), (k), (m) or (n) of FIG. 4, the cache memory 20 may transmit to the main memory 15 not only the data of a sub-block corresponding to each effective bit, for example, data "1", forming the dirty value but also the data of a sub-block corresponding to a non-effective bit, for example, data "0", indicating that the write data is not included, according to the 4-bit dirty value.

In this case, the cache memory 20 may write back the write-back data of the write-back block having a dirty value as shown in diagrams (e), (g), (j), (k), (m) or (n) of FIG. 4, in the burst length of 16 to the main memory 15 via the system bus 35.

That is, as described above with reference to diagrams (e), (j), (k) or (m) of FIG. 4, when at least on non-effective bit is included between the effective bits forming the dirty value, to improve the performance of the computer system 10, the cache memory 20 may write back the write-back data in the burst length of 16 to the main memory 15 via the system bus 35 even when the number of the effective bits forming the 4-bit dirty value is two or three.

Figure 5:
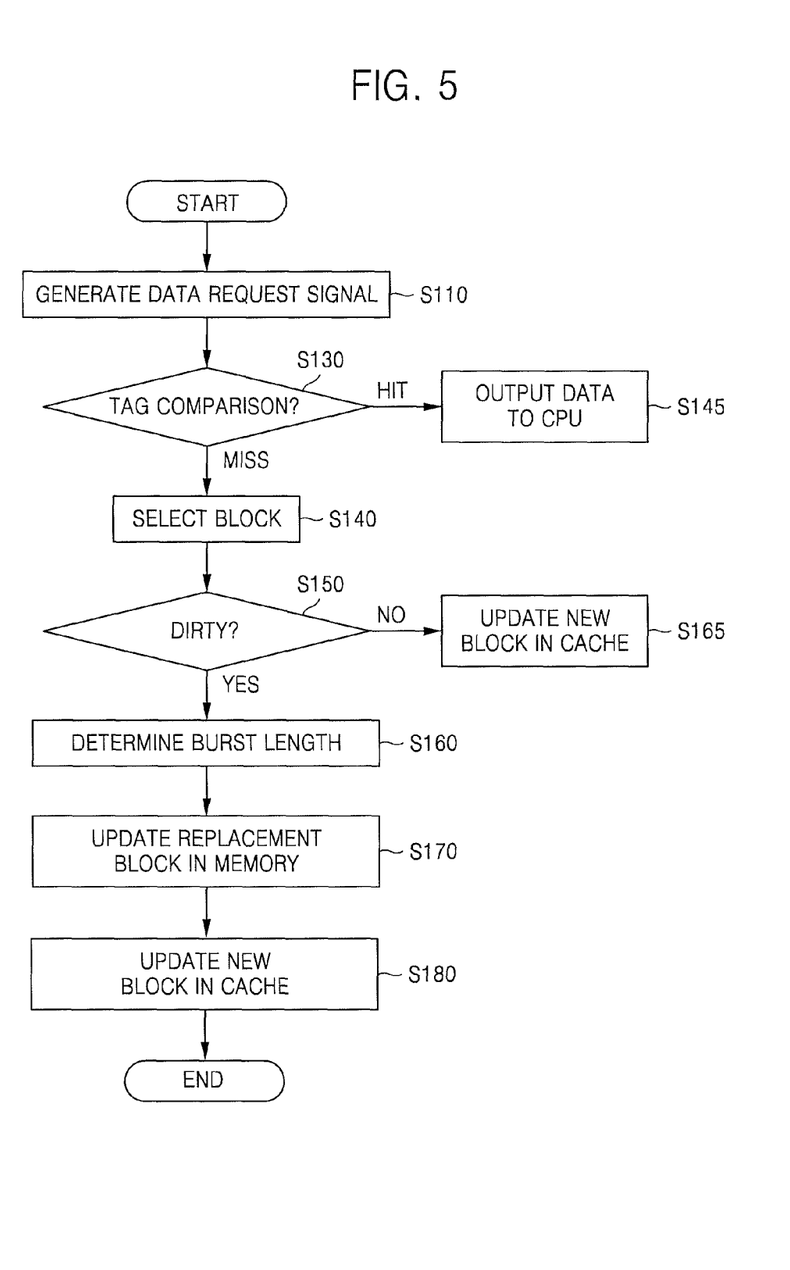
FIG. 5 is a flowchart illustrating the write-back operation performed during the write operation of the computer system according to an embodiment of the present invention.

FIG. 5 is a flowchart illustrating the write-back operation performed during the write operation of the computer system according to an embodiment of the present invention. Referring to FIGS. 1-5, in the operation of writing back the write-back data included in at least one of the blocks stored in the data storing unit 23 of the cache memory 20, first, the write data is assumed to be stored in a block, in particular, a sub-block, of the data storing unit 23.

The tag comparison unit 28 of the cache memory 20 compares a read address and the tags stored in the tag storing unit 27 in response to a command (for example, read command) including the read address output from the CPU 13 and determines HIT or MISS (S110 and S130).

When a result of the comparison is HIT, the data storing unit 23 of the cache memory 20 outputs the write data corresponding to the read address to the CPU 13 in response to the read operation signal AS1 output from the processor 29 (S145). In contrast, when the comparison result is MISS, the write-back determination unit 31 of the cache memory 20 checks a block in which the write-back operation is to be performed according to a replacement procedure, of the blocks stored in the data storing unit 23 (S140).

When the dirty value corresponding to the block does not include an effective bit, the cache memory 20 deletes the block, or the data of the block, and outputs the data request signal AS2 including the read address to the main memory 15. The cache memory 20 reads out and stores the data of a block corresponding to the data request signal AS2 (S150 and S165). Also, when the dirty value corresponding to the write-back block includes an effective bit, the cache memory 20 selects the burst length m of the write-back data based on the n-bit dirty value corresponding to the write-back block to perform the write-back block (S 160).

The cache memory 20 transmits the write-back operation signal WB1 generated based on the write-back block in which the write-back operation is to be performed and the determined burst length m, to the data storing unit 23. The data storing unit 23 in response to the write-back operation signal WB1 reads out the write-back data in the determined burst length of m and sequentially transmits the read write-back data in the burst length of m to the main memory 15 via the system bus 35 in units of bandwidths of the system bus 35 (S170).

After the write-back operation is completed, the cache memory 20 reads out the data corresponding to the data request signal AS2 from the main memory 15 in units of blocks, outputs the read date to the CPU 13 and stores the read data in the data storing unit 23, and stores a tag corresponding to the stored data in the tag storing unit 27.

The cache memory 20 according to the present embodiment performs the write-back operation to the main memory 15 by adjusting the burst length of the write-back data to include the write data according to the 4-bit dirty value during the write-back operation. Thus, since the bandwidth of the system bus 35 may be efficiently used, the efficiency of the computer system 10 including the cache memory 20 may be improved.

As described above, in the cache memory according to the present embodiment, since the burst length of the write-back data may be adjusted so that the write-back data may include most of the write data during the write-back operation, the bandwidth of the write-back data that is written back to the main memory may be reduced. Also, the cache memory may easily adjust the burst length of the write-back data. Thus, since the amount of transmission of the write-back data decreases, the latency for the transmission of the write-back data may be reduced in the system so that the system may access the main memory at high speed.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A cache memory comprising:
a write-back determination unit determining whether a block is a write-back block based on replacement information on the block;
a burst length determination unit determining a burst length of write-back data included in the write-back block based on a number of effective bits of a n-bit dirty value, an order of the effective bits with respect to non-effective bits of the n-bit dirty value, wherein each bit is in direct correlation with an updated block to be written back, and a minimum burst length, when the block is the write-back block; and
a processor outputting a first output signal for controlling a data storing unit to output the write-back data in response to the determined burst length and outputting a second output signal for performing a read operation to a system bus.

2. The cache memory of claim 1, wherein the replacement information comprises at least one of information on the block, frequency of accesses of the block, and data update time of the block.

3. The cache memory of claim 1, wherein the first output signal is a write-back operation signal and is output to the data storing unit.

4. The cache memory of claim 1, wherein the second output signal is a data request signal including a read address.

5. The cache memory of claim 1, wherein the burst length is an integer multiple of the minimum burst length.

6. The cache memory of claim 1, further comprising a dirty value storing unit storing the n-bit dirty value.

7. The cache memory of claim 1, further comprising a write-back buffer storing the write-back data output from the data storing unit to the system bus.

8. The cache memory of claim 1, wherein the burst length determination unit determining the burst length of the write-back data included in the write-back block based on an order of the effective bits with respect to non-effective bits of the n-bit dirty value.

9. A method of operating a cache memory comprising:
determining whether a block is a write-back block based on replacement information on the block;
determining a burst length of write-back data included in the write-back block based on a number of effective bits of a n-bit dirty value, an order of the effective bits with respect to non-effective bits of the n-bit dirty value, wherein each bit is in direct correlation with an updated block to be written back, and a minimum burst length, when the block is the write-back block; and
outputting a first output signal for controlling a data storing unit to output the write-back data in response to the determined burst length and outputting a second output signal for performing a read operation to a system bus.

10. The method of claim 9, wherein the replacement information comprises at least one of information on the block, frequency of accesses of the block, and data update time of the block.

11. The method of claim 9, wherein the first output signal is a write-back operation signal and is outputted to the data storing unit.

12. The method of claim 9, wherein the second output signal is a data request signal including a read address.

13. The method of claim 9, wherein the burst length is an integer multiple of the minimum burst length.

14. The method of claim 9, wherein the burst length of the write-back data included in the write-back block is determined based on an order of the effective bits with respect to non-effective bits of the n-bit dirty value.

* * * * *